(12) United States Patent
Farrell et al.

(10) Patent No.: US 6,519,561 B1
(45) Date of Patent: *Feb. 11, 2003

(54) MODEL ADAPTATION OF NEURAL TREE NETWORKS AND OTHER FUSED MODELS FOR SPEAKER VERIFICATION

(75) Inventors: Kevin Farrell, Denver, CO (US); William Mistretta, Morrison, CO (US)

(73) Assignee: T-Netix, Inc., Carrollton, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,871

(22) Filed: Nov. 3, 1998

Related U.S. Application Data

(60) Provisional application No. 60/064,069, filed on Nov. 3, 1997.

(51) Int. Cl.[7] ............................................. G10L 17/00
(52) U.S. Cl. ...................................... 704/232; 704/250
(58) Field of Search ................................ 704/232, 241, 704/249, 250

(56) References Cited

U.S. PATENT DOCUMENTS

| | | | | |
|---|---|---|---|---|
| 5,596,679 A | * | 1/1997 | Wang .......................... | 704/236 |
| 5,638,486 A | * | 6/1997 | Wang et al. .................. | 704/236 |
| 5,835,890 A | * | 11/1998 | Matsui et al. ................ | 704/255 |
| 5,839,103 A | * | 11/1998 | Mammone et al. .......... | 704/232 |

OTHER PUBLICATIONS

William Mistretta and Kevin R. Farrell, "Model Adaptation Methods for Speaker Verification," Proc. 1998 IEEE International Conference on Acoustics, Speech, and Signal Processing (ICASSP 1998), vol. 1, p. 113–116, May 1998.*

Tomoko Matsui, "Speaker Adaptation of Tied–Mixture–Based Phoneme Models for Text–Prompted Speaker Recognition," Proc. IEEE ICASSP 94, vol. 1, p. 125–128, Apr. 1994.*

Kevin R. Farrell and Richard J. Mammone, "Data Fusion Techniques for Speaker Recognition," chapter 12 in Modern Methods of Speech Processing, ed. by Ravi P. Ramachandran and Richard J. Mammone, Kluwer, p. 279–297, 1995.*

Furui S: "Recent Advances in Speaker Recognition" Pattern Recognition Letters, NL, North–Holland Publ. Amsterdam, vol. 18, No. 9, Sep. 1, 1997, pp. 859–872, XP004102227 ISSN: 0167–8655.

Bonifas J–L et al: "Text–Dependent Speaker Verification Using Dynamic Time Warping and Vector Quantization of LSF" European Conference on Speech Communication and Technology. (Eurospeech), ES, Madrid: Graficas Brens, vol. CONF 4, Sep. 18, 1995, pp. 359–362, XP000854724.

Del Alamo C M et al: "Incremental Speaker Adaptation with Minimum Error Discriminative Training for Speaker Identification" Proceedings ICSLP 96. Fourth International Conference on Spoken Language Processing (CAT. No. 96TH8206), Proceeding of Fourth International Conference on Spoken Language Processing. ICSLP '96, Philadelphia, PA, USA, Oct. 3–6, 1996, pp. 1760–1763 vol. 3, XP002154694 1996, New York, NY, USA, IEEE, USA ISBN: 0–7803–3555–4.

* cited by examiner

*Primary Examiner*—Tālivaldis Ivars Šmits
(74) *Attorney, Agent, or Firm*—Merchant & Gould P.C.; Thomas H. Young (57) ABSTRACT

The model adaptation system of the present invention is a speaker verification system that embodies the capability to adapt models learned during the enrollment component to track aging of a user's voice. The system has the advantage of only requiring a single enrollment for the user. The model adaptation system and methods can be applied to several types of speaker recognition models including neural tree networks (NTN), Gaussian Mixture Models (GMMs), and dynamic time warping (DTW) or to multiple models (i.e., combinations of NTNs, GMMs and DTW). Moreover, the present invention can be applied to text-dependent or text-independent systems.

11 Claims, 5 Drawing Sheets

Fig. 1

Adaptation of DTW template

Adaptation of GMM

Fig. 5

MODEL ADAPTATION OF NEURAL TREE NETWORKS AND OTHER FUSED MODELS FOR SPEAKER VERIFICATION

CROSS REFERENCE TO RELATED APPLICATIONS

This application claims priority from Provisional Application 60/064,069, filed Nov. 3, 1997, entitled Model Adaptation System and Method for Speaker Verification.

BACKGROUND OF THE INVENTION

1. Field of the Invention

The present invention relates to a system and method for adapting speaker verification models to achieve enhanced performance during verification and particularly, to a subword based speaker verification system having the capability of adapting a neural tree network (NTN), Gaussian mixture model (GMM), dynamic time warping template (DTW), or combinations of the above, without requiring additional time consuming retraining of the models.

The invention relates to the fields of digital speech processing and speaker verification.

2. Description of the Related Art

Speaker verification is a speech technology in which a person's identity is verified using a sample of his or her voice. In particular, speaker verification systems attempt to match the voice of the person whose identity is undergoing verification with a known voice. It provides an advantage over other security measures such as personal identification numbers (PINs) and personal information, because a person's voice is uniquely tied to his or her identity. Speaker verification provides a robust method for security enhancement that can be applied in many different application areas including computer telephony.

Within speaker recognition, the two main areas are speaker identification and verification. A speaker identification system attempts to determine the identify of a person within a known group of people using a sample of his or her voice. In contrast, a speaker verification system attempts to determine if a person's claimed identity (whom the person claims to be) is valid using a sample of his or her voice.

Speaker verification consists of determining whether or not a speech sample provides a sufficient match to a claimed identity. The speech sample can be text dependent or text independent. Text dependent speaker verification systems verify the speaker after the utterance of a specific password phrase. The password phrase is determined by the system or by the user during enrollment and the same password is used in subsequent verification. Typically, the password phrase is constrained within a fixed vocabulary, such as a limited number of numerical digits. The limited number of password phrases gives the imposter a higher probability of discovering a person's password, reducing the reliability of the system.

A text independent speaker verification system does not require that the same text be used for enrollment and testing as in a text dependent speaker verification system. Hence, there is no concept of a password and a user will be recognized regardless of what he or she speaks.

Speech identification and speaker verification tasks may involve large vocabularies in which the phonetic content of different vocabulary words may overlap substantially. Thus, storing and comparing whole word patterns can be unduly redundant, since the constituent sounds of individual words are treated independently regardless of their identifiable similarities. For these reasons, conventional vocabulary speech recognition and text-dependent speaker verification systems build models based on phonetic subword units.

Conventional approaches to performing text-dependent speaker verification include statistical modeling, such as hidden Markov models (HMM), or template-based modeling, such as dynamic time warping (DTW) for modeling speech. For example, subword models, as described in A. E. Rosenberg, C. H. Lee ad F. K. Soong, "Subword Unit Talker Verification Using Hidden Markov Models", *Proceedings ICASSP*, pages 269–272 (1990) and whole word models, as described in A. E. Rosenberg, C. H. Lee and S. Gokeen, "Connected Word Talker Recognition Using Whole Word Hidden Markov Models", *Proceedings ICASSP*, pages 381–384 (1991) have been considered for speaker verification and speech recognition systems. HMM techniques have the limitation of generally requiring a large amount of data to sufficiently estimate the model parameters.

Other approaches include the use of Neural Tree Networks (NTN). The NTN is a hierarchical classifier that combines the properties of decision trees and neural networks, as described in A. Sankar and R. J. Mammone, "Growing and Pruning Neural Tree Networks", *IEEE Transactions on Computers*, C-42:221–229, Mar. 1993. For speaker recognition, training data for the NTN consists of data for the desired speaker and data from other speakers. The NTN partitions feature space into regions that are assigned probabilities which reflect how likely a speaker is to have generated a feature vector that falls within the speaker's region.

The above described modeling techniques rely on speech being segmented into subwords. Modeling at the subword level expands the versatility of the system. Moreover, it is also conjectured that the variations in speaking styles among different speakers can be better captured by modeling at the subword level. Traditionally, segmentation and labeling of speech data was performed manually by a trained phonetician using listening and visual cues. However, there are several disadvantages to this approach, including the time consuming nature of the task and the highly subjective nature of decision-making required by these manual processes.

One solution to the problem of manual speech segmentation is to use automatic speech segmentation procedures. Conventional automatic speech segmentation processing has used hierarchical and nonhierarchical approaches.

Hierarchical speech segmentation involves a multi-level, fine-to-course segmentation which can be displayed in a tree-like fashion called dendogram. The initial segmentation is a fine level with the limiting case being a vector equal to one segment. Thereafter, a segment is chosen to be merged with either its left or right neighbor using a similarity measure. This process is repeated until the entire utterance is described by a single segment.

Non-hierarchical speech segmentation attempts to locate the optimal segment boundaries by using a knowledge engineering-based rule set or by extremizing a distortion or score metric. The techniques for hierarchical and non-hierarchical speech segmentation have the limitation of needing prior knowledge of the number of speech segments and corresponding segment modules.

A technique not requiring prior knowledge of the number of clusters is defined as "blind" clustering. This method is disclosed in U.S. patent application Ser. No. 08/827,562 entitled "Blind Clustering of Data With Application to Speech Processing Systems", filed on Apr. 1, 1997, and its corresponding U.S. provisional application no. 60/014,537 entitled "Blind Speech Segmentation", filed on Apr. 2, 1996, both of which are herein incorporated by reference. In blind clustering, the number of clusters is unknown when the clustering is initiated. In the aforementioned application, an estimate of the range of the minimum number of clusters and maximum number of clusters of a data sample is determined. A clustering data sample includes objects having a common homogeneity property. An optimality criterion is defined for the estimated number of clusters. The optimality criterion determines how optimal the fit is for the estimated number of clusters to the given clustering data samples. The optimal number of clusters in the data sample is determined from the optimality criterion. The speech sample is segmented based on the optimal boundary locations between segments and the optimal number of segments.

The blind segmentation method can be used in text-dependent speaker verification systems. The blind segmentation method is used to segment an unknown password phrase into subword units. During enrollment in the speaker verification system, the repetition of the speaker's password is used by the blind segmentation module to estimate the number of subwords in the password and locate optimal subword boundaries. For each subword segment of the speaker, a subword segmentator model, such as a neural tree network or a Gaussian mixture model can be used to model the data of each subword.

Further, there are many multiple model systems that combine the results of different models to further enhance performance.

One critical aspect of any of the above-described speaker verification systems that can directly affect its success is robustness to intersession variability and aging. Intersession variability refers to the situation where a person's voice can experience subtle changes when using a verification system from one day to the next. A user can anticipate the best performance of a speaker verification system when performing a verification immediately after enrollment. However, over time the user may experience some difficulty when using the system. For substantial periods of time, such as several months to years, the effects of aging may also degrade system performance. Whereas the spectral variation of a speaker may be small when measured over a several week period, as time passes this variance will grow as described in S. Furui, "Comparison of Speaker Recognition Methods using Statistical Features and Dynamic Features", *IEEE Transactions on Acoustics, Speech, and Signal Processing,* ASSP-29:342–350, pages 342–350, April 1981. For some users, the effects of aging may render the original voice model unusable.

What is needed is a adaptation system and method for speaker verification systems, and in particular for discriminant and multiple model-based models, that requires minimal computational and storage resources. What is needed is an adaptation system that compensates for the effects of intersession variability and aging.

SUMMARY OF THE INVENTION

Briefly described, the present invention relates to new model adaptation schemes for speaker verification systems. Model adaptation changes the models learned during the enrollment component dynamically over time, to track aging of the user's voice. The speaker adaptation system of the present invention has the advantage of only requiring a single enrollment for the speaker. Typically, if a person is merely enrolled in a single session, performance of the speaker verification system will degrade due to voice distortions as a consequence of the aging process as well as intersession variability. Consequently, performance of a speaker verification system may become so degraded that the speaker is required to re-enroll, thus, requiring the user to repeat his or her enrollment process. Generally, this process must be repeated every few months.

With the model adaptation system and method of the present invention, re-enrollment sessions are not necessary. The adaptation process is completely transparent to the user. For example, a user may telephone into his or her "Private Branch Exchange" to gain access to an unrestricted outside line. As is customary with a speaker verification system, the user may be requested to state his or her password. With the adaptation system of the present invention, this one updated utterance can be used to adapt the speaker verification model. For example, every time a user is successfully verified, the test data may be considered as enrollment data, and the models trained and modeled using the steps following segmentation. If the password is accepted by the system, the adapted system uses the updated voice features to update the particular speaker recognition model almost instantaneously. Model adaptation effectively increases the number of enrollment samples and improves the accuracy of the system.

Preferably, the adaptation schemes of the present invention can be applied to several types of speaker recognition systems including neural tree networks (NTN), Gaussian Mixture Models (GMMs), and dynamic time warping (DTW) or to multiple models (i.e., combinations of NTNs, GMMs and DTW). Moreover, the present invention can be applied to text-dependent or text-independent systems.

For example, the present invention provides an adaptation system and process that adapts neural network tree (NTN) modules. The NTN is a hierarchical classifier that combines the properties of decision trees and feed-forward Neural Networks. During initial enrollment, the neural tree network learns to distinguish regions of feature space that belong to the target speaker from those that are more likely to belong to an imposter. These regions of feature space correspond to "leaves" in the neural tree network that contain probabilities. The probabilities represent the likelihood of the target speaker having generated data that falls within that region of feature space. Speaker observations within each region are determined by the number of "target vectors" landing within the region. The probability at each leaf of the NTN is computed as the ratio of speaker observations to total observations encountered at that leaf during enrollment.

During the adaptation method of the present invention, the number of targeted vectors, or speaker observations, is updated based on the new utterance at a leaf. Each vector of the adaptation utterance is applied to the NTN and the speaker observation count of the leaf that the vector arrives is incremented. By maintaining the original number of speaker observations and imposter observations at each leaf, the probability can be updated in this manner. The probabilities are then computed with new leaf counts. In this manner, the discriminant model can be updated to offset the degraded performance of the model due to aging and intersession variability.

In another embodiment of the present invention, statistical models such as a Gaussian mixture model (GMM) can be adapted based on new voice utterances. In the GMM, a region of feature space for a target speaker is represented by a set of multivariate Gaussian distributions. During initial enrollment, certain component distribution parameters are determined including the mean, covariance and mixture weights corresponding to the observations. Essentially, each of these parameters is updated during the adaptation process based on the added observations obtained with the updated voice utterance. For example, the mean is updated by first scaling the mean by the number of original observations. This value is then added to a new mean based on the updated utterance, and the sum of these mean values is divided by the total number of observations. In a similar manner, the covariance and mixture weights can also be updated.

In another embodiment of the present invention, template-based approaches, such as dynamic time warping (DTW), can be adapted using new voice utterances. Given a DTW template that has been trained with the features for N utterances, the features for a new utterance can be averaged into this template. For example, the data for the original data template can be scaled by multiplying it by the number of utterances used to train it, or in this case, N. The data for the new utterance is then added to this scaled data and then the sum is divided by the new number of utterances used in the model, N+1. This technique is very similar to that used to update the mean component of the Gaussian mixture model.

Although not necessary, the adaptive modeling approach used in the present invention is preferably based on subword modeling for the NTN and GMM models. The adaptation method occurs during verification. For adapting the DTW template, it is preferred that whole-word modeling be used. As part of verification, features are first extracted for an adaptation utterance according to any conventional feature extraction method. The features are then matched, or "warped", onto a DTW template. This provides 1) a modified set of features that best matches the DTW template and 2) a distance, or "distortion", value that can be used as a measurement for speaker authenticity. The modified set of features output by the DTW warping has been found to remedy the negative effects of noise or speech that precedes or follows a spoken password. At this point, the warped features are used to adapt the DTW template.

Next, the feature data is segmented into sub-words for input into the NTN and GMM models. While several types of segmentation schemes can be used with the present invention, including hierarchical and nonhierarchical speech segmentation schemes, it is preferred that the spectral features be applied to a blind segmentation algorithm, such as that disclosed in U.S. patent application Ser. No. 08/827,562 entitled "Blind Clustering of Data With Application to Speech Processing Systems", filed on Apr. 1, 1997, and its corresponding U.S. provisional application no. 60/014,537 entitled "Blind Speech Segmentation", filed on Apr. 2, 1996, both of which are herein incorporated by reference. During enrollment in the speaker verification system, the repetition in the speaker's voice is used by the blind segmentation module to estimate the number of subwords in the password, and to locate the optimal subword boundaries.

The data at each sub-word is then modeled preferably with a first and second modeling module. For example, the first modeling module can be a neural tree network (NTN) and the second modeling module can be a Gaussian mixture model (GMM). In this embodiment, the adaptive method and system of the present invention is applied to both of these subword models individually in addition to the DTW template to achieve enhanced overall performance.

The outputs of these models, namely the NTN, GMM and DTW, are then combined, according to any one of several multiple model combination algorithms known in the art, to make a decision with respect to the speaker.

The resulting performance after adaptation is comparable to that obtained by retraining the model with the addition of new speech utterances. However, while retraining is time-consuming, the adaptation process, can conveniently be performed following a verification, while consuming minimal computational resources. Further, the adaptation is transparent to the speaker. An additional benefit of adaptation is that the original training data does not need to be stored, which can be burdensome for systems deployed within large populations.

The invention can be used with a number of other adaptation techniques, in addition to the model adaption described and claimed herein. These techniques include fusion adaption, channel adaption and threshold adaption.

The invention will be more fully described by reference to the following drawings.

DESCRIPTION OF THE PREFERRED EMBODIMENTS

Figure 1:
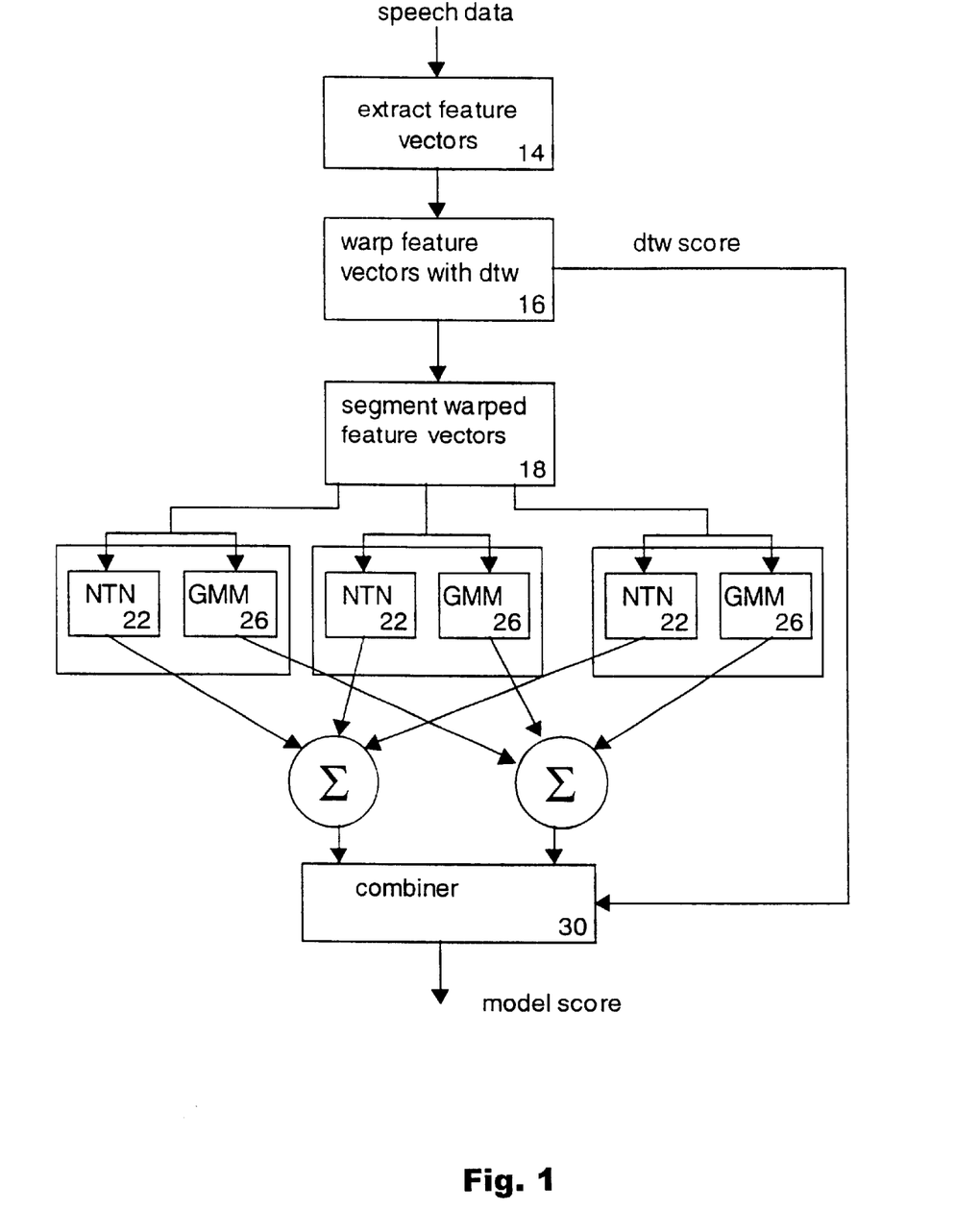
FIG. 1 is a schematic diagram of the speaker verification system in accordance with the teachings of the present invention.

FIG. 1 illustrates a schematic diagram of a multiple model speaker recognition system 10. Preferably, the model is a text-dependent speaker recognition system comprising a dynamic time warping component 16, neural tree network components (NTN) 22 and Gaussian mixture model (GMM) 26 components. Alternatively, the present invention may be used to adapt models comprising combinations including DTW with NTN models, GMM and NTN models, and DTW with GMM models, or individual models.

Sub-word processing is performed by the segmentor 18, with each sub-word output feeding into an NTN 22 and GMM 26 module. The adaptive modeling system and method of the present invention is described in detail below with reference to the speaker verification system shown in FIG. 1.

As part of verification, features must first be extracted for an adaptation utterance. Thus, the speech sample is applied as a speech signal to pre-processing and feature extraction modules 14 for converting the speech signal into spectral feature vectors. The pre-processing includes analog to digital conversion of the speech signal. The analog to digital conversion can be performed with standard telephony boards such as those manufactured by Dialogic. A speech encoding method such as ITU G711 standard $\mu$ and A law can be used to encode the speech samples. Preferably, a sampling rate of 8000 Hz is used. Alternatively, the speech may be obtained in digital format, such as from an ISDN transmission. In such a case, a telephony board is used to handle the Telco signaling protocol.

In the preferred embodiment, the computer processing unit for the speaker verification system is an Intel Pentium platform general purpose computer processing unit (CPU) of at least 100 MHZ having approximately 10 MB associated RAM memory and a hard or fixed drive as storage. Alternatively, an additional embodiment could be the Dialogic Antares card.

Pre-processing can include mean removal of the DC offset in the signal, pre-emphasis to normalize the spectral tilt in the speech spectrum, as well as the removal of background silence in the speech signal. Background silence in the speech signal can be removed using conventional methods such as speech and silence discrimination techniques using energy and/or zero crossings. Thereafter, the pre-processed speech is Hamming windowed and analyzed; for example in 30 millisecond analysis frames with a 10 millisecond shift between consecutive frames.

After preprocessing, feature extraction is performed on the processed speech in module 14. Spectral features are represented by speech feature vectors determined within each frame of the processed speech signal. In the feature vector module 14, spectral feature vectors can be obtained with conventional methods such as linear predictive (LP) analysis to determine LP cepstral coefficients, Fourier Transform Analysis and filter bank analysis. One method of feature extraction is disclosed in U.S. Pat. No. 5,522,012, entitled "Speaker Identification and Verification System," issued on May 28, 1996 and incorporated herein by reference. A preferred method for obtaining spectral feature vectors is a 12th order LP analysis to determine 12 cepstral coefficients.

The result of the feature extraction module is that vectors representing a template of the utterance are generated. Preferably, the template is stored in a database. Following storage of the template, the speech undergoes dynamic time warping.

Next, the feature data is warped using a dynamic time warping template 16. This removes extraneous noise or speech that precedes or follows the spoken password. The warped feature data is used for the subsequent segmentation and model evaluation. Additionally, a score is computed and stored during this warping process. This score provides a similarity measure between the spoken utterance and DTW template that can be used as a speaker verification score. This score, referred to as "x", represents a distance value ranging between 0 and infinity. The score can be mapped onto the scale of a probability by raising its negative to an exponential, i.e., exp(-x). At this point it can be combined with the scores of the NTN and GMM to provide a third score component towards the overall model score.

Next, the speech is preferably segmented into sub-words using a blind segmentation module 18. The preferred technique for subword generation is automatic blind speech segmentation, or "Blind Clustering", such as that disclosed in U.S. patent application Ser. No. 08/827,562 entitled "Blind Clustering of Data With Application to Speech Processing Systems", filed on Apr. 1, 1997, and its corresponding U.S. provisional application No. 60/014,537 entitled "Blind Speech Segmentation", filed on Apr. 2, 1996, both of which are herein incorporated by reference and assigned to the assignees of the present invention. During enrollment in the speaker verification system, the automatic blind speech segmentation determines the number of subwords in the password and the location of optimal subword boundaries. Additionally, the subword durations are normalized by the total duration of the voice phrase and stored in a database for subsequent use during verification.

Alternative approaches to subword generation may be used with the present invention. A first alternative is the traditional approach, where segmentation and labeling of speech data is performed manually by a trained phonetician using listening and visual cues.

A second alternative to subword generation is automatic hierarchical speech segmentation, which involves a multi-level, fine-to-course segmentation. This segmentation can be displayed in a tree-like fashion called dendogram. The initial segmentation is a fine level with the limiting case being a vector equal to one segment. Thereafter, a segment is chosen to be merged with either its left or right neighbor using a similarity measure. This process is repeated until the entire utterance is described by a single segment.

A third alternative to subword generation is automatic non-hierarchical speech segmentation. This segmentation method attempts to locate the optimal segment boundaries by using a knowledge engineering-based rule set or by extremizing a distortion or score metric.

After subwords are obtained, the data at each sub-word is then modeled preferably with one or more combinations of a first and second modeling module, as shown in FIG. 1. For example, the first modeling module can be a neural tree network (NTN) 22 and the second modeling module can be a Gaussian mixture model (GMM) 26. The NTN 22 provides a discriminative-based speaker score and the GMM 26 provides a speaker score that is based on a statistical measure. FIG. 1 shows N models for the NTN classifier 22 and N models for the GMM classifier 26. Both modules 22, 26 can determine a score for each spectral vector of a subword segment.

The scores of the NTN 22 and GMM 26 modules can be combined to obtain a composite score for the subword in block 30. In the preferred embodiment, the results of the dynamic time warping 16, neural tree network 22 and the Gaussian mixture models 26 are combined using a linear opinion pool, as described below. Other ways of combining the data, however, can be used with the present invention including a log opinion pool or a "voting" mechanism, wherein hard decisions from the DTW 16, NTN 22 and GMM 26 are considered in the voting process. Since these three modeling approaches tend to have errors that are uncorrelated, performance improvements can be obtained by combining the model outputs.

NTN modules 22 are used to model the subword segments of the user password. The NTN 22 is a hierarchical classifier that uses a tree architecture to implement a sequential linear decision strategy. Specifically, the training data for an NTN 22 consists of data from a target speaker, labeled as one, along with data from other speakers that are labeled as zero. The data from other speakers is preferably stored in a database which may be RAM ROM, EPROM, EEPROM, hard disk, CD ROM, a file server, or other storage device.

The NTN 22 learns to distinguish regions of feature space that belong to the target speaker from those that are more likely to belong to an impostor. These regions of feature space correspond to leaves in the NTN 22 that contain probabilities. These probabilities represent the likelihood of the target speaker having generated data that falls within that region of feature space, as described in K. R. Farrell, R. J. Mammone, and K. T. Assaleh, "Speaker Recognition using Neural Networks and Conventional Classifiers", *IEEE Trans. Speech and Audio Processing*, 2(1), part 2 (1994). The functioning of NTN networks with respect to speaker recognition is also disclosed in U.S. patent application Ser. No. 08/159,397, filed Nov. 29, 1993, entitled "Rapidly Trainable Neural Tree Network", U.S. patent application Ser. No. 08/479,012 entitled "Speaker Verification System,"

U.S. patent application Ser. No. 08/827,562 entitled "Blind Clustering of Data With Application to Speech Processing Systems", filed on Apr. 1, 1997, and its corresponding U.S. Provisional Application no. 60/014,537 entitled "Blind Speech Segmentation", filed on Apr. 2, 1996, each of which is incorporated herein by reference in its entirety. The adaptation of the NTN 22 model is described in detail below.

As discussed above, a Gaussian mixture model GMM 26 is also used to model each of the subwords. In the GMM 26, a region of feature space for a target speaker is represented by a set of multivariate Gaussian distributions. In the preferred embodiment, the mean vector and covariance matrix of the subword segments are obtained as a by-product of the blind segmentation module 18 and are saved as part of the GMM modules 26, as described in U.S. patent application Ser. No. 08/827,562 entitled "Blind Clustering of Data With Application to Speech Processing Systems", filed on Apr. 1, 1997, and its corresponding U.S. provisional application no. 60/014,537 entitled "Blind Speech Segmentation", filed on Apr. 2, 1996, both of which are herein incorporated by reference. The GMM probability distribution function is expressed as $$p(x/\phi) = \sum_{i=1}^{c} P(w_i) p(x/\mu_1, \sigma_1^2).$$

Each of the C mixture components is defined by a mixture weight $P(w_i)$ and normal distribution function $p(x/\mu_1, \sigma_i^2)$, where $\mu_i$ is the mean vector and $\sigma_i$ is the covariance matrix. In the preferred embodiment, the normal distribution is constrained to have a diagonal covariance matrix defined by the vector $\sigma_1^2$. The PDF is used to produce the sub-word GMM score.

A scoring algorithm is used for each of the NTN and GMM models. The output score (estimated a-posteriori probabilities) of the subword model is combined across all the subwords of the password phrase, so as to yield a composite score for the utterance.

The scoring algorithm for combining the score of the subword models 22, 26 can be based on either of the following schemes:

(a) PHRASE-AVERAGE: Averaging the output scores for the vectors over the entire phrase, (b) SUBWORD-AVERAGE: Average the score of vectors within a subword, before averaging the (averaged) subword scores, and (c) SUBWORD-WEIGHING: Same as (b) subword-average scoring, but the (averaged) subword scores are weighted in the final averaging process.

Transitional (or durational) probabilities between the sub-words can also be used while computing the composite score for the password phrase. The preferred embodiment is (a) phase-average scoring. The result of scoring provides a GMM 26 score and an NTN 22 score, which must then be combined.

In the preferred embodiment, a linear opinion pool method is used to combine the output scores from the DTW 16, NTN 22 and GMM 26. The linear opinion pool method computes the final score as a weighted sum of the outputs for each model:

$$p_{linear}(x) = \sum_{i=1}^{n} a_1 p_1(x).$$

Once the variables in the above equation are known, a threshold value is output and stored in the database. The threshold value output is compared to a "final score" in the testing component to determine whether a test user's voice has so closely matched the model that it can be said that the two voices are from the same person.

Now that the model 10 has been disclosed, in general, the adaptation methods applied to the aforementioned DTW 16, NTN 22 and GMM 26 modules are disclosed in detail. The adaptation occurs during verification. First, features are extracted from an adaptation utterance. These features are warped onto a DTW template 16 and then segmented into sub-word partitions in the segmentor 18 that can be processed by the corresponding NTN 22 and GMM 26 models at each sub-word.

Figure 2:
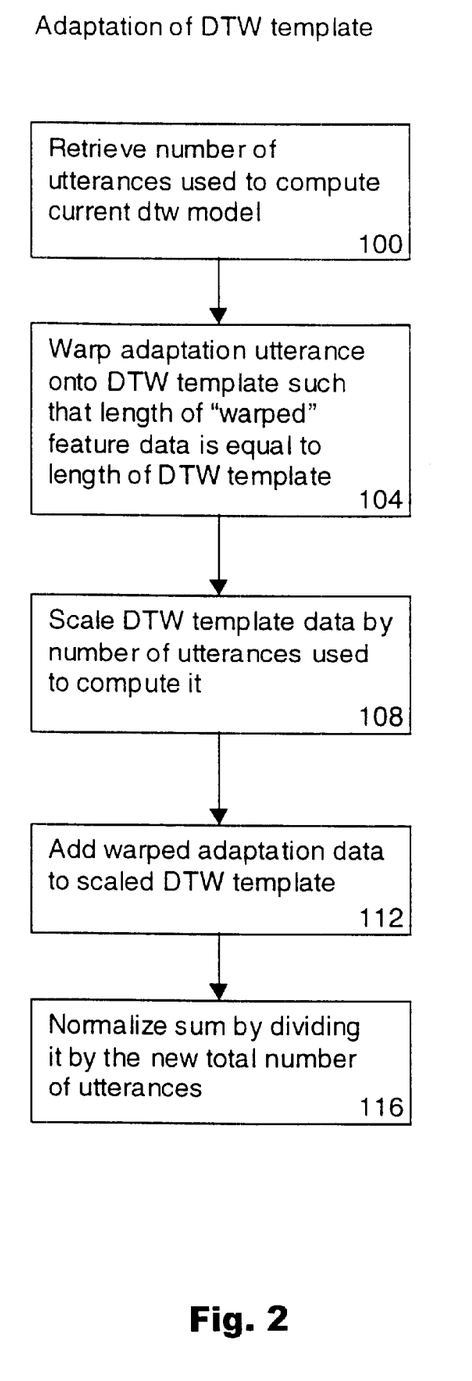
FIG. 2 is a flow diagram illustrating the adaptation of the dynamic time warping (DTW) template during speaker verification.

The preferred method of DTW adaptation is shown in FIG. 2. In summary, the DTW 16 warps the feature data for subsequent use by the segmentor 18. The DTW template 16 can be adapted by averaging the warped feature data into the original DTW template 16. The resulting template is then updated in the model.

The DTW adaptation method can be better explained with reference to FIG. 2. The first step 100 is to retrieve the stored number of utterances (referred to as M) used to compute the current DTW template. The incoming feature data is then warped onto the DTW template, as described in step 104. A result of warping feature data onto a DTW template is that the new feature data is of the same length as the DTW template. In other words, the incoming data now has the same number of feature vectors as the DTW template. Each feature vector of the DTW template is then scaled (meaning multiplied) by the number of utterances used to compute the original template, as shown in step 108. Then referring to step 112, the warped feature data is added to the scaled DTW feature data. This is accomplished by adding each element of each warped feature vector to the corresponding element of the scaled feature vector in the DTW template. Then, as shown in item 116, the sum of the scaled and warped feature data is normalized by dividing it by the new number of utterances, which is M+1.

Figure 3:
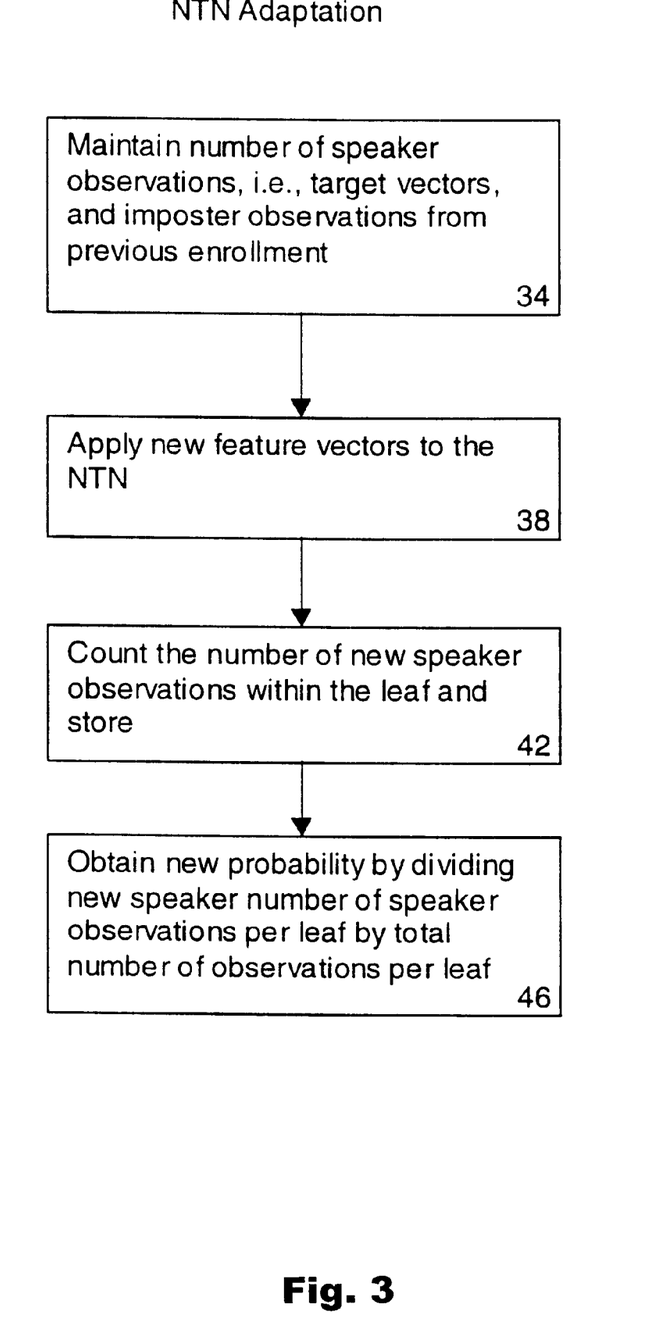
FIG. 3 is a flow diagram of the neural network tree adaptation system during speaker verification.

The preferred method of NTN adaptation is shown in FIG. 3. The NTN 22 determines the speaker score for a given vector by traversing the tree and retrieving the probability at the leaf which the vector arrived. The probability at each leaf of the NTN 22 is computed as the ratio of speaker observations (i.e., target vectors) to total observations (i.e., total vectors) encountered during training. By maintaining the number of speaker observations and impostor observations at each leaf, as set forth in step 34, the probability update is straight-forward. Each vector of the adaptation utterance is applied to the NTN 22, as set forth in block 38. and the number of speaker observations within a leaf is counted, as set forth in block 42. The new number of speaker observations and total observations are stored in memory. This concludes the verification process for the NTN. However, if testing, the new number of speaker observations is now divided by the total number of observations to obtain an updated probability, as set forth in step 46.

Figure 4:
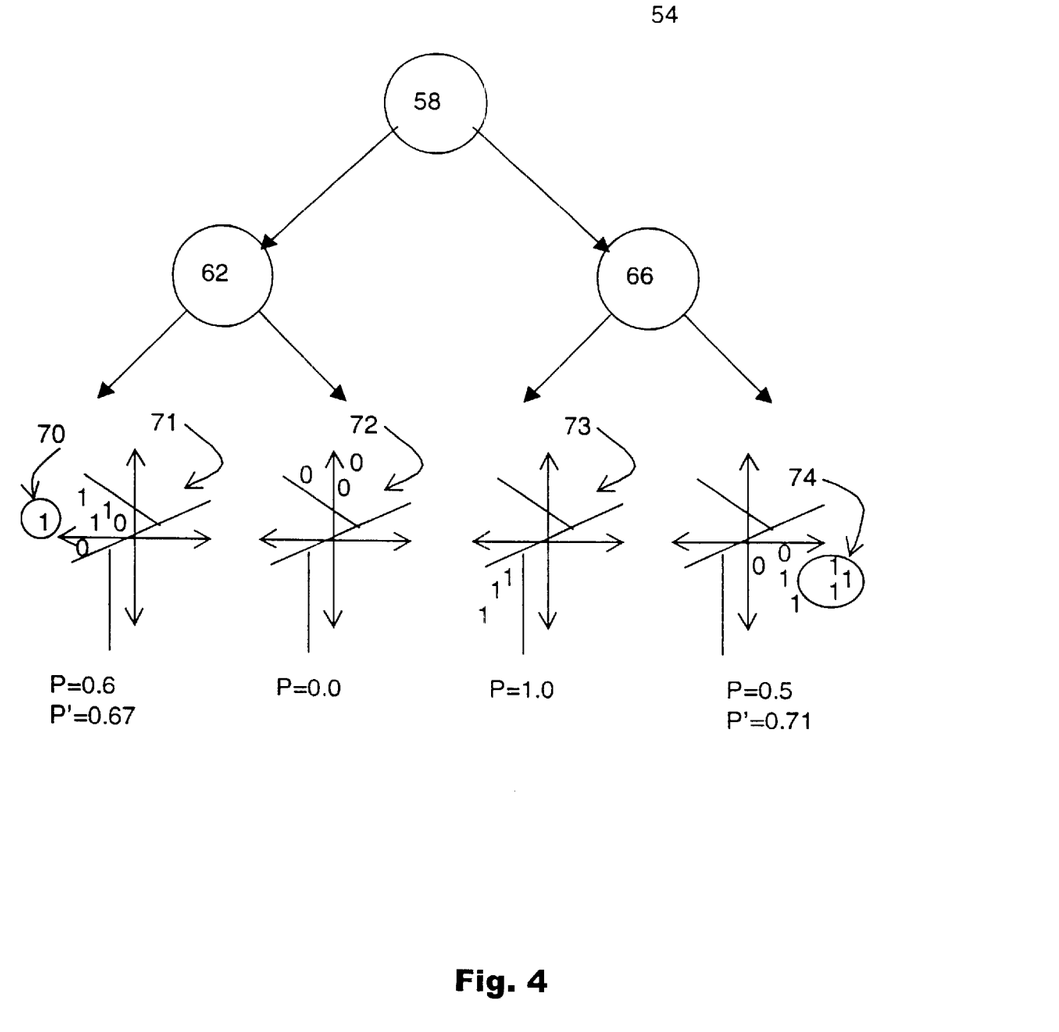
FIG. 4 is a diagram illustrating the adaptation of the neural network tree (NTN) module according to the teachings of the present invention.

The NTN adaptation method can be better understood with reference to FIG. 4. The original speaker target vectors are designated as "1" in the figure. Imposter vectors are designated by a "0". The adaptation vectors based on the updated voice utterance are those within the dashed circles 70, 74. For the left-most leaf 71 in FIG. 4, the original probability is computed as 0.6, by dividing the number of original speaker target vectors (i.e., three) by the total number of vectors (i.e., five). After applying the updated speech utterance, the adapted probability is determined to be 0.67, by dividing the speaker target vectors (i.e., 4) by the total number of vectors (i.e., 6). Advantages can also be obtained by applying more weight to the new observations.

Since the NTN 22 also retains imposter counts at each leaf, it can also be adapted with an imposter utterance. This would be accomplished in a similar manner as to how the speaker counts were added. Specifically, the feature vectors for an imposter utterance are applied to the NTN 22 and the leaf imposter counts are updated to reflect the imposter data that came to that leaf. The NTN 22 is unique in this sense (as compared to the DTW and GMM models) in that it can be adapted with imposter data.

Since only the leaves of the NTN 22 are modified during adaptation, there is the implicit assumption that the feature space partitions do not have to change. Adapting the discriminant boundaries is not feasible as the nodes and leaves only retain information regarding the weight vectors and observation counts, respectively.

Figure 5:
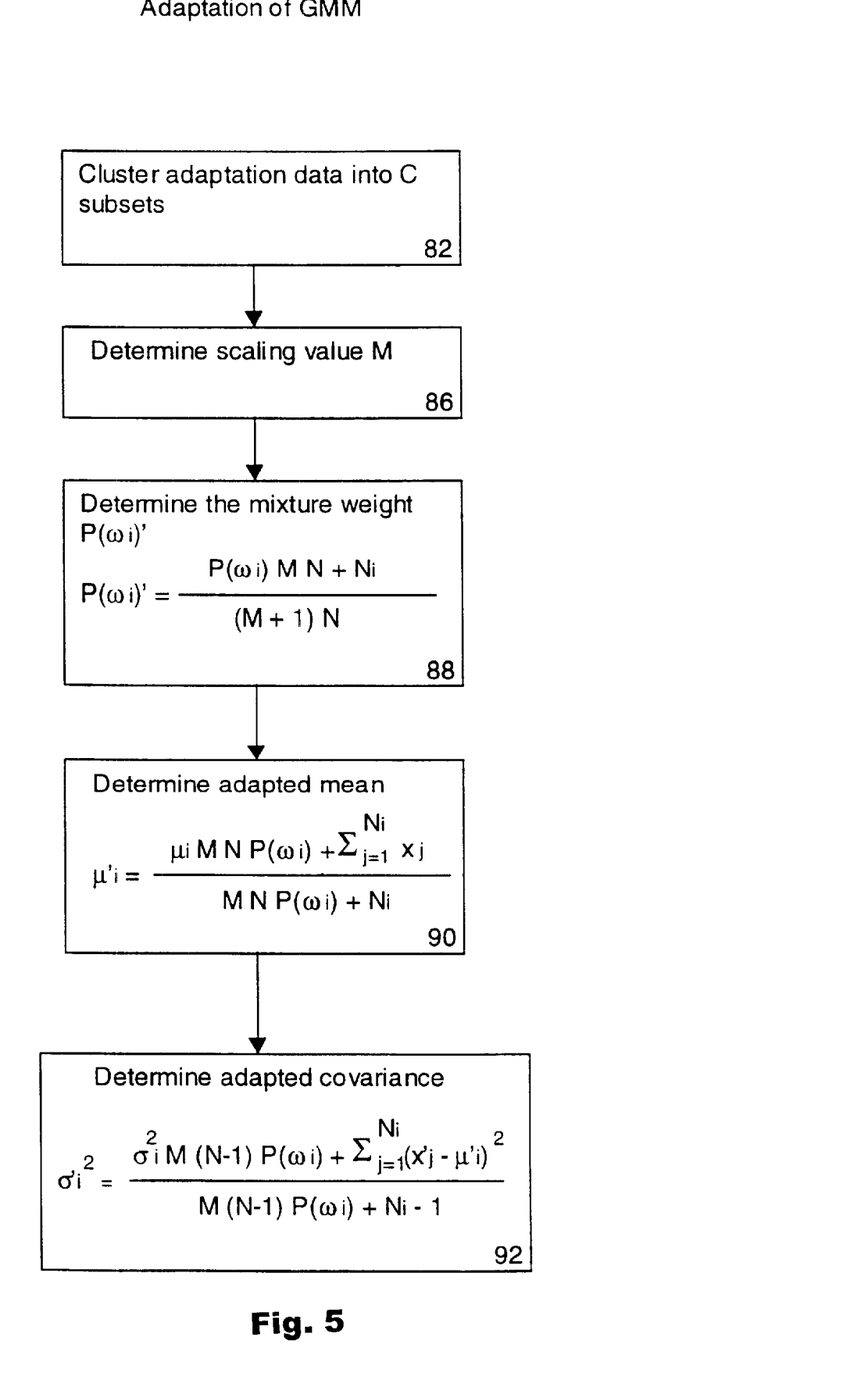
FIG. 5 is a flow diagram illustrating the adaptation of the Gaussian mixture model (GMM) during speaker verification.

In the preferred embodiment, the GMM 26 modules are also adapted individually using sub-word data acquired from the blind segmentation. The adaptation of a single sub-word GMM module 26 is described since the process is identical for each sub-word. The adaptation method for a single sub-word GMM is shown in FIG. 5. Referring to the first equation above, the adaptation process, under processor control, produces an updated set of GMM Parameters $\{P(w_i)', \mu_i', s_i'^2; i=1 \ldots C\}$ for the GMM PDF that reflects the contribution of the adaptation phrase, as described below.

A clustering of the adaptation data is performed as the first step in the individual GMM adaptation, as shown in step 82. If the adaptation features are defined by X with N vectors, the clustering groups the data into C subsets $X^i$; $1 \ldots C$, where $X^i$ contains $N_i$ vectors. A simple Euclidean distance between the input vector and component distribution means is used to partition the data.

The verification model retains information on the number of utterances used to train the GMM along with the number of prior adaptations. The sum of these values Mis used to scale the mixture weights, means and variances before adding new statistics, as set forth in step 86. The algorithm also makes the assumption that the prior utterances all contain N training vectors. It does this because the true sizes of the previous training and adaptation utterances are not retained as part of the verification model. Given these assumptions, the adapted component distribution parameters (i.e., mixture weight, mean and covariance) can be determined in steps 88, 90 and 92 as follows:

$$P(\omega_i)' = \frac{P(\omega_i)MN + N_i}{(M+1)N}. \quad (3)$$

$$\mu_i' = \frac{\mu_i MNP(\omega_i) + \sum_{j=1}^{N_i} x_j'}{MNP(\omega_i) + N_i} \quad (4)$$

$$\sigma_i'^2 = \frac{\sigma_i^2 M(N-1)P(\omega_i) + \sum_{i=1}^{N_i}(x_j' - \mu_i')^2}{M(N-1)P(\omega_i) + N_i - 1} \quad (5)$$

This approach to adapting the distribution parameters weights all training and adaptation utterances equally. This means that each new adaptation phrase has less effect on the GMM. By limiting M to a maximum value, a simple forgetting factor can be incorporated into the adaptation.

EXAMPLES

Example 1

All results presented herein are produced from experiments conducted on a verification database that contains nine enrolled speakers. Additionally, there are 80 separate speakers that are used as the development speakers for training the neural tree network. The database contains two data sets with collections separated by a six month period. The first set contains 13 repetitions of each person speaking their full name and five repetitions of them speaking each other person's name. This amounts to 58 recordings for each speaker. The second set contains ten more repetitions of each person speaking their own name. We refer to a repetition of a person saying their own name as a true-speaker repetition and a person saying another person's name as an impostor repetition. The two data collections are referred to as the recent set and the aged set respectively.

Three training scenarios are examined. In each case, all training repetitions were taken from the recent collection set. The scenarios are outlined below.

1. Train a verification model with three true-speaker repetitions. (TR3)
2. Train a verification model with six true-speaker repetitions. (TR6)
3. Train a verification model with three true-speaker repetitions and adapt on three true-speaker repetitions. (TR3AD3)

For the second and third training scenarios, the first three training repetitions are kept fixed, while the second set of three repetitions are varied using a resampling scheme. The resampling technique is based on a leave-M—out data partitioning where M=3. For each training, three new repetitions are used. This allows for three independent training sequences for the ten available true-speaker repetitions. The fixed training repetitions used for scenarios 2 and 3 are the same as those used in scenario 1. The first scenario provides a baseline system performance, the second shows the benefit of adding speaker information to the original training, while the third shows the benefit of adapting the model using the additional speaker information.

A set of three experiments are initially performed for each training scenario. This include testing the GMM 26 and NTN 22 models individually along with testing a combined model. DTW adaptation was not examined for this example. All testing repetitions are taken from the recent collection set. For the baseline training scenario, ten true-speaker repetitions and 45 impostor repetitions are tested for each speaker model. Equal error rates (EER) are then calculated for the system by collecting performance across speakers.

For scenarios 2 and 3, three resampling tests are performed for each individual experiment. For each test, the appropriate three true-speaker repetitions are excluded from the experiment. This results in 7 true-speaker and 45 impostor repetitions for each test or 21 true-speaker and 135 impostor repetitions for each speaker.

Table 1 displays the performance of these experiments. Several observations can be made when inspecting the table. First, the additional speech data provides a performance benefit when the model is trained on all the data. Second adapting on the additional training data also improves performance to some degree. The GMM adaptation does a better job at matching the training performance than the NTN adaptation. Although the NTN does not adapt as well as the GMM, it still helps reduce the EER when applying adaptation to the combined model.

TABLE 1

Comparative Data: Verification EER performance for several training scenarios and verification model types. All experiments evaluated with the recent collection data.

| Training Scenario | GMM | NTN | Combined |
|---|---|---|---|
| TR3 | 5.3% | 6.0% | 4.0% |
| TR6 | 1.9% | 1.8% | 0.63% |
| TR3 AD3 | 1.7% | 4.3% | 1.5% |

Example 2

A second set of experiments are performed for the combined verification model. For this set, true-speaker testing repetitions are taken from the aged collection set. All other training and testing conditions are kept the same as the previous experiments. These results are displayed in Table 2. The table shows that all training scenarios suffer when evaluating the aged true-speaker repetitions. This is to be expected, since the verification model is trained on data collected over a short period of time. There is still improvement even though when the model is trained on additional data from the recent set. As with the previous experiments, the adaptation also improves the performance built not as much as the full training.

TABLE 2

Comparative Data: Verification EER performance for several scenarios and combined model type. All experiments evaluates with the aged collection data.

| Training Scenario | Combined Model |
|---|---|
| TR3 | 12.0% |
| TR6 | 5.4% |
| TR3 AD3 | 7.2% |

It was shown above that the GMM error rate was reduced from 5.3% to 1.7% and the NTN performance improved from 6.0% to 4.3% when adapting on additional training data. A classifier that combines these two models shows similar improvement and performs better than either classifier in isolation. In addition, when testing the combined classifier on aged data, the error rate reduced from 12.% to 7.2%. The overall system performance using adaptation is comparable to that achieved by training the model with the adaptation information.

The present model adaptation method and system has been described with respect to a text-dependent speaker verification system. The invention, however, could also be applied to text-independent systems, as well. Because there is no temporal ordering of feature data, preferably only a single NTN or GMM is trained. The DTW template is omitted in this case as it does not rely on the temporal ordering of the feature data. The adaptation procedures described above can be applied to any such models.

Although the adaptation method and procedure has been described above with respect to a multiple model system, clearly the present invention can be applied to enhance performance of template-based speaker verification models (DTW), neural tree network model based speaker verification systems or statistical speaker verification models (GMM), individually.

It has been shown that adaptation is an effective method for improving the performance of a speaker verification model. However, it is also important to discuss the criteria that determines when adaptation should take place. Adapting a model with utterances that are not from the speaker for which the model was trained, can have negative performance implications. Hence, a strategy must be used for recommending which data should be used for adaptation and which data should be discarded. Three recommendations for adaptation criteria are as follows. One is to compare the composite model score to a threshold and deem it acceptable for adaptation if it passes some threshold criteria. Another method is to analyze the model scores individually and if the majority of the models recommend adaptation (by evaluating threshold criteria) then use the data to adapt all models. Finally, another scenario may be where data is known to belong to the speaker whose model is to be adapted. In this case, the criteria checks can be bypassed and the model can be updated with the data.

In addition to adapting the model components of a model, one can also adapt the threshold component. In the preferred embodiment of the invention, the threshold is computed as follows. During model training, estimates are made for the average speaker score and average imposter score. The average speaker score is obtained by evaluating the trained model with the original training utterances and recording the scores. The average score is then computed from these scores and the average score is scaled to account for the bias in the data. This is done to compensate for the fact that the data used to train a model will always score higher than data that is independent of the model training. The average imposter score is obtained by applying imposter data to the trained model and computing the average of the resulting scores. Imposter attempts on the speaker model can be synthesized by accessing feature data from the antispeaker database that is similar to the subword data used to train a model. This data can be pieced together into an imposter attempt and then applied to a speaker model. The threshold is currently computed by selecting a value between the average imposter score and average speaker score.

Adaptation can be applied to the threshold component of the model as follows. First, the number of utterances used to compute the imposter average (referred to as N) and speaker average (referred to as M) must be included as part of the model and retrieved upon adaptation. When adapting the threshold with the score from the valid speaker, the speaker mean is multiplied by M and the adaptation score is added to this quantity. The resulting sum is then divided by (M+1) and this denotes the new speaker mean. Similarly, when adapting the threshold with an imposter score, the imposter mean is multiplied by N and the adaptation score is added to this quantity. The resulting sum is then divided by (N+1) and this denotes the new imposter mean. Future threshold positions would then use the modified speaker and imposter means.

The adaptable speaker recognition system of the present invention can be employed for user validation for telephone services such as cellular phone services and bill-to-third-party phone services. It can also be used for account validation for information system access.

The model adaptation techniques of the present invention can be combined with fusion adaptation and threshold adaptation, as described in copending patent application Ser. No. 08/976,280, entitled "Voice Print System and Method," filed on Nov. 21, 1997 by Sharma et al., herein incorporated by reference. All of the adaptation techniques may effect the number and probability of obtaining false-negative and false-positive results, so should be used with caution. These adaptive techniques may be used in combination with channel adaptation, or each other, either simultaneously or at different authorization occurrences.

The foregoing description of the present invention has been presented for purposes of illustration and description which is not intended to limit the invention to the specific embodiments described. Consequently, variations and modifications commensurate with the above teachings, and within the skill and knowledge of the relevant art, are part of the scope of the present invention. It is intended that the appended claims be construed to include alternative embodiments to the extent permitted by law.

We claim:

1. An adaptable speaker verification system with model adaptation, the system comprising:
   a receiver, the receiver obtaining a voice utterance;
   a means, connected to the receiver, for extracting predetermined features of the voice utterance;
   a means, operably connected to the extracting means, for segmenting the predetermined features of the voice utterance, wherein the features are segmented into a plurality of subwords; and
   at least one adaptable model, connected to the segmenting means, wherein
      the model models the plurality of subwords and outputs one or more scores, and the models are updated dynamically based on the received voice utterance to incorporate the changing characteristics of a user's voice and
      the adaptable models comprise at least one adaptable neural tree network model, the adaptable neural tree network model resulting in an NTN score.

2. The adaptable speaker verification system of claim 1, further comprising:
   a means, connected to the extracting means, for warping the voice utterance onto a dynamic warping template, the warping means providing a DTW score;
   wherein the warping means is adapted based on the voice utterance.

3. An adaptable speaker verification system with model adaptation, the system comprising:
   a receiver, the receiver obtaining a voice utterance;
   a means, connected to the receiver, for extracting predetermined features of the voice utterance;
   a means, operably connected to the extracting means, for segmenting the predetermined features of the voice utterance, wherein the features are segmented into a plurality of subwords;
   at least one adaptable model, connected to the segmenting means, wherein the model models the plurality of subwords and outputs one or more scores, and the models are updated dynamically based on the received voice utterance to incorporate the changing characteristics of a user's voice and
   wherein the the adaptable models comprise:
      at least one adaptable Gaussian mixture model, the adaptable Gaussian mixture model resulting in a GMM score; and
      at least one adaptable neural tree network model, the adaptable neural tree network model resulting in an NTN score.

4. The adaptable speaker verification system of claim 3, further comprising:
   a means, connected to the extracting means, for warping the voice utterance onto a dynamic warping template, the warping means providing a DTW score;
   wherein the warping means is adapted based on the voice utterance.

5. An adaptable speaker verification method, including the steps of:
   obtaining enrollment speech from a known individual;
   receiving test speech from a user;
   extracting predetermined features of the test speech;
   warping the predetermined features using a dynamic time warping template, wherein the dynamic warping template is adapted based on the predetermined features of the test speech, resulting in the creation of warped feature data and a dynamic time warping score from the adapted dynamic warping template;
   generating subwords from the warped feature data;
   scoring the subwords using a plurality of adaptable models, wherein the adaptable models are adapted based on the subwords derived from the test speech and wherein the scoring comprises scoring at least one adaptable neural tree network model;
   combining the results of each classifier score and the dynamic time warping score to generate a final score; and
   comparing the final score to a threshold value to determine whether the test speech and enrollment speech are from the known individual.

6. An adaptable speaker verification method, wherein at least one neural tree network model is adapted based on an adaptation utterance, comprising the following steps:
   storing number of speaker observations, number of imposter observations and a total number of observations from previous enrollments or verifications;
   obtaining an adaptation utterance from a speaker;
   extracting predetermined features from the speaker adaptation utterance;
   segmenting the predetermined features into a plurality of subwords;
   applying the plurality of subwords to at least one neural tree network model;
   counting the number of updated speaker observations within each leaf of the neural tree network;
   storing the number of updated speaker observations in memory; and
   updating probabilities by dividing the number of updated speaker observations by a total number of observations at each leaf, thereby resulting in an adapted neural tree network model.

7. The adaptable speaker verification method of claim 6, further comprising the steps of:
   digitizing the obtained adaptation speaker utterance; and
   preprocessing the digitized speaker utterance.

8. The adaptable speaker verification method of claim 6, wherein the step of segmenting comprises generating subwords using automatic blind speech segmentation.

9. The adaptable speaker verification method of claim 6, further comprising the step of:

warping the predetermined features from the speaker adaptation utterance using a dynamic time warping template, wherein the dynamic warping template is adapted based on the predetermined features of the test speech, resulting in the creation of warped feature data; and wherein the step of segmenting segments the warped feature data into a plurality of subwords.

10. An adaptable speaker verification method, wherein at least one nueral tree network model is adapted based on an adaptation utterence, comprising the following steps:

storing number of speaker observations, number of imposter observations and a total number of observations from previous enrollments or verifications;

obtaining an adaptation utterence from an imposter;

extracting predetermined features from the imposter adaptation utterence;

segmenting the predetermined features into a plurality of subwords;

applying the plurality of subwords to at least one neural tree network model;

counting the number of updated imposter observations within each leaf of the neural tree network;

storing the number of updated imposter observations in memory; and updating probabilities by dividing the number of updated speaker observations by a total number of observations at each leaf, thereby resulting in an adapted neural tree model.

11. An adaptable speaker verification method, including the steps of:

obtaining enrollment speech from a known individual;

receiving test speech from a user;

extracting predetermined features of the test speech;

warping the predetermined features using a dynamic time warping template, wherein the dynamic warping template is adapted based on the predetermined features of the test speech, resulting in the creation of warped feature data and a dynamic time warping score from the adapted dynamic warping template;

generating subwords from the warped feature data; scoring the subwords using a plurality of adaptable models, wherein the adaptable models are adapted based on the subwords derived from the test speech and wherein the scoring comprises scoring at least one adaptable Gaussian mixture model, the adaptable Gaussian mixture model resulting in a GMM score; and scoring at least one adaptable neural tree network model, the adaptable neural tree network model resulting in a NTN score.;

combining the results of each classifier score and the dynamic time warping score to generate a final score; and comparing the final score to a threshold value to determine whether the test speech and enrollment speech are from the known individual.

\* \* \* \* \*